(12) United States Patent
Soyland Hansen

(10) Patent No.: US 7,470,419 B2
(45) Date of Patent: Dec. 30, 2008

(54) GRANULES OF POWDERY MINERAL AND METHOD FOR PRODUCTION OF GRANULES

(75) Inventor: Tor Soyland Hansen, Sogne (NO)

(73) Assignee: Elkem AS, Kristiansand (NO)

( * ) Notice: Subject to any disclaimer, the term of this patent is extended or adjusted under 35 U.S.C. 154(b) by 268 days.

(21) Appl. No.: 11/570,529

(22) PCT Filed: Jun. 16, 2005

(86) PCT No.: PCT/NO2005/000211

§ 371 (c)(1), (2), (4) Date: Dec. 13, 2006

(87) PCT Pub. No.: WO2006/009455

PCT Pub. Date: Jan. 26, 2006

(65) Prior Publication Data
US 2008/0003128 A1  Jan. 3, 2008

(30) Foreign Application Priority Data
Jul. 20, 2004  (NO) .................................. 20043075

(51) Int. Cl.
B01F 17/00 (2006.01)
B01F 17/50 (2006.01)
B01J 2/02 (2006.01)
B01J 2/06 (2006.01)
B01J 8/22 (2006.01)
C01G 45/00 (2006.01)
C01G 45/02 (2006.01)

(52) U.S. Cl. .......................... 423/605; 423/49; 423/50; 423/52; 423/265; 423/267; 423/274; 239/8; 239/9; 507/100; 507/103; 507/106; 507/107; 507/108; 507/109; 507/110; 507/117; 507/118; 507/119; 507/122; 507/124; 507/127; 507/128; 507/129; 507/134; 507/135; 507/139; 507/140; 507/200; 507/203; 507/206; 507/207; 507/209; 507/266

(58) Field of Classification Search .................. 423/49, 423/50, 52, 265, 267, 274, 605; 239/8, 9; 507/100, 103, 106–110, 117–119, 122, 124, 507/127–129, 134, 135, 139, 140, 200, 203, 507/206, 207, 209, 266
See application file for complete search history.

(56) References Cited

U.S. PATENT DOCUMENTS

| | | | |
|---|---|---|---|
| 4,812,302 A * | 3/1989 | Laughlin et al. ............ 423/605 |
| 4,946,505 A | 8/1990 | Jungk | |
| 5,007,480 A | 4/1991 | Anderson | |
| 5,215,583 A | 6/1993 | Krockert et al. | |
| 5,322,563 A | 6/1994 | Van Bonn et al. | |
| 6,695,990 B1 | 2/2004 | Dunnous et al. | |

FOREIGN PATENT DOCUMENTS

NO   154801   12/1986

* cited by examiner

*Primary Examiner*—Timothy C Vanoy
*Assistant Examiner*—Serena L Hanor
(74) *Attorney, Agent, or Firm*—Lucas & Mercanti, LLP

(57) ABSTRACT

The present application relates to granules of powdery mineral particles produced by spray granulation of a liquid slurry comprising powdery minerals particles having particle size below 10 m, at least one water-reducing agent and/or at least one binder agent and/or at least one dispersing agent. The application further relates to a method for producing such granules.

9 Claims, No Drawings

GRANULES OF POWDERY MINERAL AND METHOD FOR PRODUCTION OF GRANULES

FIELD OF TECHNOLOGY

The present invention relates to granules of powdery minerals particularly for granules of manganomanganic oxide particles for use in drilling mud and oil well cement slurries and to a method for production of such granules.

BACKGROUND ART

From U.S. Pat. No. 5,007,480 it is known drilling mud and oil well cement slurries for different purposes such as well cementing, completion fluids, packer fluids, drilling fluids, isolation fluids and other related fluids containing manganomanganic oxide particles as weight agent. The manganomanganic oxide particles are recovered from gases that evolve during oxygen refining of molten ferro-manganese. The particle size of the manganomanganic oxide particles is generally below 10 microns with an average particle diameter less than 1 micron.

One drawback with the use of the manganomanganic oxide particles of U.S. Pat. No. 5,007,480 is the poor flow characteristics of the dry particles. Both for offshore and on-shore use of the manganomanganic oxide particles it would be convenient to use silos for handling and storage of the material. However, due to the poor flow characteristics of the material it is difficult to discharge the material from silo-trucks, silos of delivery boats or stationary silos as the fine particles tend to form bridges in silos and handling systems, particularly in presence of moisture.

For the same reasons it is obvious that metering and feeding of the material into drilling mud and oil well cement slurry from a silo of any size by use of screw conveyors or vibrating devices is inaccurate and unreliable or sometimes even impossible.

The manganomanganic oxide particles loose their flowability after handling and may no longer flow freely after being stored in a silo for a short time. It might result in substantial human effort to remove material from a blocked silo unless the silo is specially designed and are fully equipped with special and expensive devices to handle such sticky material. In some instances the material may therefore also be difficult to move over longer distances using pneumatic transport as commonly by the industry.

Material handled in big bags shows similarly lack of flowability and emptying a big bag through a bottom spout might become impossible and the whole bottom of the bag might be cut away to get the material out.

The same problems as described above in connection with manganomanganic oxide also goes for other powdery minerals used as additives in drilling muds and well cement slurries such as ilmenite, barite and hematite.

Fine dry powders like this will have the ability to behave dusty and have a negative impact on the environment during handling in open air. It may lead to a potential health hazardous situations for the workers due to its manganese-rich content or giving a coloration of the surroundings requiring thorough cleaning resulting in disposals.

To overcome these problems it has been a desire to convert the powdery materials to a particulate agglomerated or granulated powder that gives the required for flow charsterisitics of the material as well as reduced dusting.

Agglomeration of the manganomanganic oxide particles and other powdery minerals to form granules can in principle be done by a number of conventional methods such as briquetting and compaction processes as well various ways of making pellets, spray dried granules or fluidised bed dried products and use of inorganic or organic substances as binding aids.

However, in order to successfully use agglomerated powdery mineral particles in well drilling applications, it is necessary to use binders that make it possible to redisperse the agglomerated particles in a water or an oil phase. Redispersion means that the agglomerates upon dispersion in water or oil are broken down into the original particles. Further, any binders used must be compatible with the well drilling composition it shall be used in.

For this reason non of the traditional ways of making granules, including use of traditional binders, such as molasses, starch, sodium silicate, etc., gives a product that is suitable for the needs when used in the well drilling applications.

As the granules need to be perfectly dispersed applying traditional liquid mixing equipment used by the industry, the particular granulated product must not be stronger bound than the singular particle will be released from the group of particles in a granule to give the desired application effect.

Handling of the granules after processing, through bagging units, storage and transport handling, transfer by use of blowers into silos, compaction due to its weight in a silo, activated with fluidisation, feeding screws, etc. may result in a too early disintegration of the granules thereby causing silo blockages or feeding problems if the granules do not have sufficient strength.

On the one hand: the granules must be stable enough to survive all such handling without disintegration. On the other hand: the granules must be able to easily disintegrate under low shear stress in the liquid application suspension and in dry applications.

Well drilling application mixtures whether cement slurries, drilling, completion and packer fluids, contain a set of additives in the various recipes which has to comply with the required technical characteristics and be compatible with the temperatures and pressures at specific depth of the earth depending on drilling target and work situation. Any use of additives to make granules free flowing and dispersable, also has to show compatibility with other additives in the drilling mixtures.

Since well drilling takes place in an open natural environment by humans, any substances used shall also comply with environmental and safety regulations for use of chemical substances in the nature and by workers.

These above-mentioned requirements set strict limitations to binding additives and other chemical substances to be used for the production of the handling-stable, but easy dispersible granules.

The untreated manganomanganic oxide contains 2-4% of magnetite particles, $Fe_3O_4$, as impurities with similar specific gravity. Used as ingredient in drilling mud, such contamination might impregnate the formation surface of the drill-hole and give false magnetic reading on geophysical instruments or drill navigation devices because of its influence on the local natural magnetic field. In processing of manganomanganic oxide to form the desired granules, it is therefore also a need to remove or minimise the content of magnetic particles before the granules are formed.

Some sources of manganomanganic oxide may also contain variable amounts of moisture (0.2%-15%), which after storage and partly drying out will give relatively hard lumps, it all causing problems for handling of the material through any dry processing method or wet processing with only stirring.

DESCRIPTION OF INVENTION

The present invention thus according to a first aspect relates to granules of powdery mineral particles produced by spray granulation of a liquid slurry comprising powdery mineral particles having particle size below 10 μm, at least one water-reducing agent and/or at least one binder agent and/or at least one dispersing agent.

The powdery mineral particles are selected among manganomanganic oxide, barite, ilmenite and hematite. Most preferably the powdery mineral particles is manganomanganic oxide.

Preferably the granules have a water content of between 0.1 and 0.5% by weight and more preferably between 0.2 and 0.4% by weight.

The spray dried granules are preferably made from a liquid slurry containing 5-35% by weight of water.

As liquid will have to be removed during the spray drying process by heating the liquid slurry to evaporate the liquid, it is preferred to use a slurry containing a minimum amount of liquid. The lower the liquid content per unit material in the slurry, the lower energy cost and higher productivity is obtained.

In order to reduce the liquid content in the mixture while maintaining required fluidity/viscosity, it is preferred that the slurry contains surface active additives or water-reducing additives. Such additives may be one or more agents that alone or in combinations with binding and/or dispersing additives give the liquid slurry the needed fluidity/viscosity. The agents used to give the liquid slurry a suitable fluidity/viscosity are selected among naftalene-sulfonates, ligno-sulfonates, melamines, acrylic polymers and hexameter phosphates.

Similarly, use of certain selected binding additives in the liquid slurry will give the granular product a desired stability during handling in order to remain as a free flowing powder until final outlet of the transport system. Such additives may be one or more binding agents that alone or in combinations with water-reducing and/or dispersing additives give the granulated product the needed handling strength. The bining agent is selected among ammonium lignin sulphonate and the like, dextrans, sugar, polymethaccrylates, polyvinyl alcohol, polyetylenium, metakaolin, water-glass, or surface active agents or water-reducing additives with binding effects, such as hexameter phosphates, ligno-sulphonates or naftalene-sulphonates.

Also similarly, use of certain selected dispersing additives in the liquid slurry will give the granulated product a desired ability to suspend or disperse sufficient quickly in liquid solutions in order to act technically as required by the application. Such additives may be one or more dispersing agents that alone or in combinations with water-reducing and/or binding additives give the product the needed dispersion for the required impact as used in the application mixtures. The dispersing agents are selected among sodium capryloiminodipropionat, tridesyl alcohol etoksilat, alkylnaphtalensulphate sodiumsalt, other surface active agents or water-reducing agents with dispersing effects, such as hexameter phosphates, ligno-sulphonates, acryl polymers, melamine or naftalene-sulphonates.

Some of the above water-reducing agents, binding agents and dispersing agents have complementary effects and may therefore contribute, increase or reduce the impact of other additives as a water-reducer, as a binder or as a dispersing agent; also depending on dosage rate and mixing order. For example some effective dispersing agents show negative impact on binding agents, and vice versa. Optimal combination of such additives with complimentary effects can reduce the need for certain expensive additives, simplify mixing or reduction of dosage rate.

The total amount of additives in the liquid slurry is preferably between 0.05 and 1.5% by weight based on the weight of manganomanganic oxide.

According to a preferred embodiment the water-reducing agent, the binder and the dispersing agent are all selected among lignin sulphonates. Preferably the water-reducing agent is a sodium ligno-sulphonate and/or calcium ligno-sulphonate, the binder is a calcium-sulphonate and/or a sodium ligno-sulphonate and the dispersing agent is a calcium ligno-sulphonate and/or sodium ligno-sulphonate.

The present invention further relates to a method for producing spray dried granules of powdery mineral particles, having a particle size below 10 microns, where a liquid slurry containing powdery mineral particles are subjected to spray drying, which method is characterized in that the liquid slurry contains 5-35% by weight of water and at least one water-reducing agent, and/or at least one binder agent and/or at least one dispersing agent and where said slurry is supplied to a spray drying apparatus where it is dried by supply of hot air to provide spray dried granules having a water content of between 0.1 and 0.5% by weight.

According to a preferred embodiment the slurry is subjected to wet screening before being supplied to the spray drying apparatus in order to remove coarse particles or agglomerates of particles.

It has been found that the granules according to the present invention has a sufficient strength to be handled and transported while at the same time being dispersable in liquid.

The manganomanganic oxide granules according to the invention, can, in addition to the use as an additive in drilling fluids and well drilling slurries, also be used in animal nutrition, in welding powders and ceramics.

EXAMPLE 1

In a conventional continuous spray drying apparatus a liquid slurry having the following compositions was spray dried.

1000 kg manganomanganic oxide was mixed with 250 lt. water, 0.75 kg calcium ligno-sulphonate, 0.5 kg sodium ligno-sulphonate A and 0.15 kg sodium ligno-sulphonate B. The water content of the slurry was thus 20% by weight.

16 kg of slurry was supplied to the spray drying apparatus per minute at a temperature of about 260° C. The gas outlet temperature was kept at about 100° C.

The produced granules had water content of between 0.1 and 0.3% by weight and a size between 50 microns and 500 microns.

The flowability of the produced granules was measured according to the following procedure:

A special laboratory equipment consisting of 5 small silo-shaped funnels made from glass were mounted on a stable frame. The funnel openings have increasing diameter from funnel 1 (2 mm) to funnel 5 (18 mm). 50 gram of the produced granules was added to funnel 1 and number of fingerpicks needed on the funnel in order to have the 50 grams of granules flow through the opening was recorded. Excellent flow will go through funnel 1 with less than 5 picks. A product with less, but fair flow, may need 100 picks for funnel 1 and 1 pick for funnel 3. Unprocessed powdery manganomanganic oxide material will require more than 50 picks on funnel 5 and possibly over 1000 picks on funnel 3.

Four different samples of produced granules were tested for flowability. The results of the flowability test for the produced granules are shown in Table 1.

TABLE 1

| Sample No. | Picks funnel 1 | Picks funnel 2 | Picks funnel 3 |
|---|---|---|---|
| 1 | 0 | 0 | 0 |
| 2 | 3 | 0 | 0 |
| 3 | 1 | 0 | 0 |
| 4 | 0 | 0 | 0 |

The results in Table 1 show that the produced granules have excellent flowability.

In order to measure the dispersability of the produced granules in water the following procedure was used:

40 grams of granules were mixed with 60 gram water and high shear mixed for 10 seconds after which 25 ml of the slurry was filled into a 25 ml measuring glass. Free water appears after a while on the top above the main slurry. The height of the main slurry is measured every 15 minutes for 2 hours.

A sample A of granules according to the invention was tested by this procedure. For comparison purpose a sample B of untreated manganomanganic oxide was tested by same procedure.

The results are shown in Table 2

TABLE 2

| Sample | 15 min | 30 min | 45 min | 60 min | 75 min | 90 min | 105 min | 120 min |
|---|---|---|---|---|---|---|---|---|
| A | 22.7 | 21.0 | 19.1 | 17.7 | 14.5 | 12.7 | 12.1 | 11.6 |
| B | 21.5 | 20.6 | 19.2 | 17.7 | 15.9 | 15.0 | 14.7 | 14.5 |

The results in Table 2 shows that granules according to the invention have about the same dispersability as unprocessed manganomanganic oxide.

In order to verify the dispersability in well drilling cement slurry applications, tests were made by the use of granules according to invention sample A (fluid loss and free water) as well as drilling fluid application tests (SAG and electric-stability). For comparison purposes the same test were made with unprocessed manganomanganic oxide, sample B. The results are shown in Table 3.

TABLE 3

| Application | Cement slurry | | Drilling fluid | |
|---|---|---|---|---|
| Sample | Fluid loss | Free water | SAG factor | El. stability |
| A | 48 ml | 0 ml | 0.510 | 1050 mV |
| B | 52 ml | 0 ml | 0.511 | 1085 mV |

Table 3 shows that the granules according to the present invention have about the same effect in cement slurries and drilling fluids as unprocessed manganomanganic oxide.

Finally the strength of the produced granules was measured according to the following procedure:

250 ml of produced granules was filled into a 250 ml measuring glass and was transferred to another measuring glass allowing the granules to have a free vertical drop into the second measuring glass by the use of a funnel. This transfer was carried out a certain number of times to allow the granules to gradually break down. Flowability was measured in the same way as described above after a certain number of transfers. For bad flowability the weight of material leaving the funnel after 20 fingerpicks was used to calculate the 50 grams value. The results are sown in Table 4.

TABLE 4

| No. of transfers | funnel 1 | funnel 2 | funnel 3 | funnel 4 | funnel 5 |
|---|---|---|---|---|---|
| 5 | 1 | 1 | 0 | 0 | 0 |
| 10 | 19 | 1 | 0 | 0 | 0 |
| 15 | 200 | 1 | 1 | 0 | 0 |
| 25 | 500 | 71 | 1 | 0 | 0 |
| 50 | 1250 | 200 | 20 | 4 | 0 |

The results in Table 4 show that the granules according to the invention have a sufficient strength in order to be handled without too much breakdown.

The invention claimed is:

1. Granules of powdery manganomanganic oxide particles produced by spray granulation of a liquid slurry comprising powdery manganomanganic oxide particles having particle size below 10 μm, at least one water-reducing agent and/or at least one binder agent and/or at least one dispersing agent where the total amount of agents in the liquid slurry is between is between 0.05 and 1.5% by weight based on the weight of manganomanganic oxide particles and where said granules have a water content between 0.1 and 0.5% by weight.

2. Granules according to claim 1, wherein the granules have a water content of between 0.2 and 0.4% by weight.

3. Granules according to claim 1, wherein the granules are made from a liquid slurry containing 5-35% by weight of water.

4. Granules according to claim 1, wherein the water-reducing agent is selected among naphthalene-sulfonate, lignosulfonate, melamine, acrylic polymers and hexametaphosphate.

5. Granules according to claim 1, wherein the binder agent is selected among ammonium lignosulfonate, dextran, sugar, polymethacrylate, polyvinyl alcohol, polyethylene, metakaolin water-glass, hexametaphosphate, lignosulfonate and naphthalene-sulfonate.

6. Granules according to claim 1, wherein the dispersing agent is selected among sodium capryloiminodipropionate, tridecyl alcohol ethoxylate, alkyl naphthalene sulfate sodium salt, hexametaphosphate, lignosulfonate, acryl polymers, melamine and naphthalene sulfonate.

7. Granules according to claim 1, wherein the water reducing agent is sodium lignosulfonate and/or calcium lignosulfonate, the binder agent is calcium sulfonate and/or sodium lignosulfonate and the dispersing agent is calcium lignosulfonate and/or sodium lignosulfonate.

8. A method for producing spray dried granules of manganomanganic particles having a particle size below 10 microns, comprising the steps of spray drying a liquid slurry containing manganomanganic oxide particles, wherein the liquid slurry contains 5-35% by weight of water and at least one water-reducing agent, and/or at least one binder agent and/or at least one dispersing agent, where said slurry is supplied to a spray drying apparatus and spray dried by supplying hot air to provide spray dried granules having a water content of between 0.1 and 0.5% by weight.

9. Method according to claim 8, wherein the liquid slurry is subjected to wet screening before being supplied to the spray drying apparatus.

* * * * *